United States Patent [19]
Wake

[11] 3,885,743
[45] May 27, 1975

[54] FLOW CONTROL DEVICE FOR PROVIDING LOW FLOW RATES

[75] Inventor: Harold E. Wake, Lindsay, Calif.

[73] Assignee: Apache Corporation, Minneapolis, Minn.

[22] Filed: Sept. 5, 1974

[21] Appl. No.: 503,524

[52] U.S. Cl. ............... 239/542; 239/272; 239/123; 239/488
[51] Int. Cl..... B05b 15/00; B05b 15/02; B05b 1/34
[58] Field of Search ............ 239/76, 271, 272, 463, 239/487, 488, 542, 115, 116, 123; 138/42

[56] References Cited
UNITED STATES PATENTS

| | | | |
|---|---|---|---|
| 2,776,862 | 1/1957 | Bloom | 239/116 |
| 3,586,239 | 6/1971 | Blass | 239/487 X |
| 3,804,334 | 4/1974 | Curry | 239/542 X |

FOREIGN PATENTS OR APPLICATIONS

| | | | |
|---|---|---|---|
| 1,136,993 | 12/1968 | United Kingdom | 239/488 |

Primary Examiner—Robert S. Ward, Jr.
Attorney, Agent, or Firm—Dorsey, Marquart, Windhorst, West & Halladay

[57] ABSTRACT

A flow control device comprises a hollow cylindrical female member with one open end having smooth internal walls, an inlet at the end opposite the open end and an outlet intermediate of the two ends. A male insert comprises a handle and a solid cylindrical portion having helical threads formed thereon and protuberance which at least partially circumscribes the male insert. When the device is in its assembled position, the protuberance frictionally engages the female member to seal the open end of the female member and to maintain the device in its assembled position and the helically threaded portion of the male insert cooperates with the female member to form a helical flow path between the inlet and outlet. The device may be partially or fully disassembled by using the handle. Rotation of the handle, without complete disassembly, is also possible. Such partial disassembly or limited movement can be utilized to clear the helical flow path without disrupting the flow through the device.

16 Claims, 9 Drawing Figures

PATENTED MAY 27 1975 3,885,743
SHEET 1
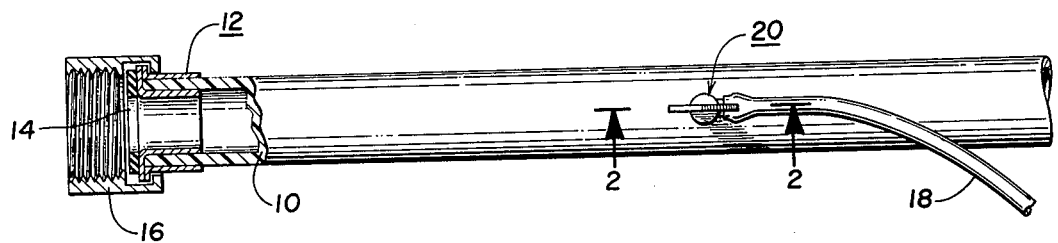
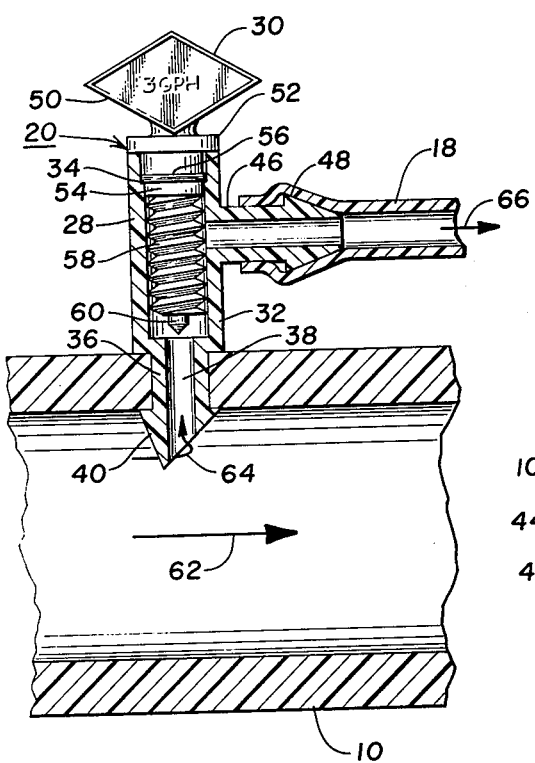
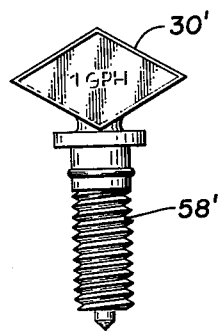
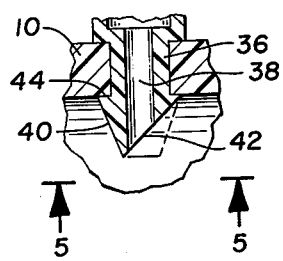
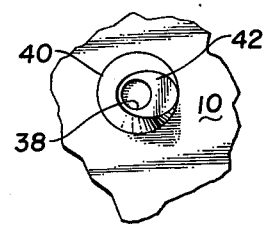
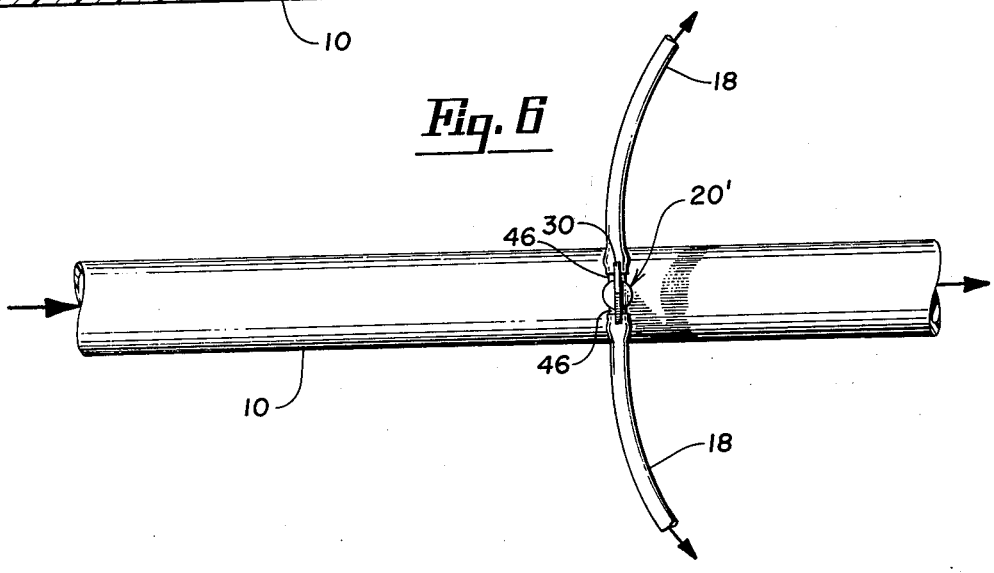

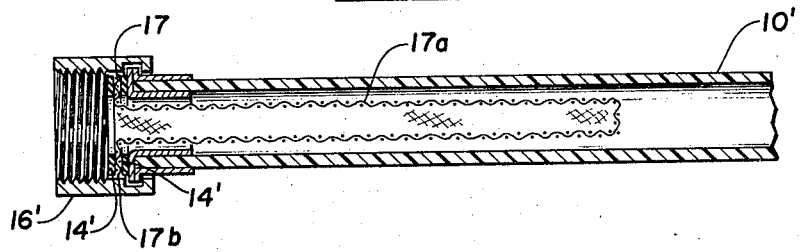
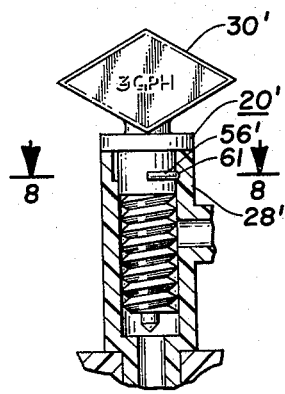
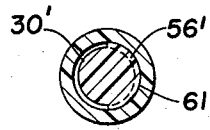

FLOW CONTROL DEVICE FOR PROVIDING LOW FLOW RATES

BACKGROUND OF THE INVENTION

1. Field of the Invention

This invention relates to a flow control device and more particularly to a flow control device which provides a low flow rate.

2. Description of the Prior Art

Flow control devices which provide low flow rates are desirable in many applications, the most notable being in irrigation systems. Such devices used in irrigation systems enable continuous irrigation without using valves which must be periodically opened to supply water. The use of such valves increases the cost of irrigation due both to their initial cost and to the cost of the labor necessary to open and close them at the proper times. There are flow control devices known in the prior art which provide a low enough flow rate therethrough that water for irrigation may be supplied continuously, and irrigation systems using such devices are known as "drip" irrigation systems.

One type of flow control device which is used in drip irrigation systems to provide the necessary low flow rate incorporates a female member which has a male member disposed therein so that the corresponding facing surfaces thereof are in close proximity. At least one member has a helical thread, or other circuitous channel, formed therein which defines a long flow path of relatively small cross-section. An inlet and outlet are so arranged that the fluid must follow the flow path in order to pass through the device, and since the small cross-section of the flow path substantially restricts the flow, the flow rate is reduced enough to allow water to flow therethrough continuously without damage to the plants being irrigated.

In the operation of known flow control devices, the small cross-sectional area often causes the flow path to become clogged with particles entrained in the flow of irrigating fluid. This may necessitate removal of the male member in order to flush the particles from the device. Such removal involves a time-consuming and inconvenient operation which may vary with the type of construction.

In one type of known control device the female members have smooth internal walls and only the male member has threads. In another type, both members have threads, and the female member has internal threads of a depth less than the depth of threads formed on the male member. The latter type of device is exemplified by U.S. Pat. No. 2,752,201 issued to Blass and in this type of device the male member must be completely unscrewed from the female member to remove it. This is a time-consuming operation, particularly if there are many such devices used in a particular irrigation system.

Two basic configurations of flow control devices of the type in which the female member has smooth internal walls have been disclosed in the prior art. The first configuration is exemplified by U.S. Pat. No. 3,729,142 issued to Rangel-Garza, et al., and in U.S. Pat. No. 3,815,636 issued to Menzel. Both of these patents show a flow control device in which a female member has an open end, an inlet through which water enters and an outlet through which water flows to the plants to be irrigated. A male member is inserted into the open end to seal it, and is held in place therein by a keying arrangement in which tabs on the male member engage apertures in the female member to hold the male member in place. The use of the tab-aperture arrangement renders it difficult to assemble the male member in place, increases the cost of producing the male and female members over that which would be necessary if the tab-aperture arrangement could be eliminated, and breaks the seal between the male and female members once the tabs are removed from the apertures. Thus, such devices increase cost and labor to some degree, savings of which is one principal advantage in a drip irrigation system, and when the device is to be flushed, disrupt the flow through the device since the open end of the female member is no longer sealed once the tabs are no longer in engagement with the apertures.

The second basic configuration is shown in U.S. Pat. No. 3,693,657 issued to Olson. In this configuration, the male member is held in place by frictional engagement with the female member, which is desirable from a standpoint of ease of disengagement of the male and female members. However, the device is placed in "series" with a main supply hose of the irrigation system and the water flows through the device. Thus, the male member must be formed so as to permit flow therethrough and the main supply hose must be severed to permit insertion of the device into the irrigation system. When the male and female members are separated for cleaning, the flow in the supply hose is interrupted and the large amount of flow through this hose makes it highly inconvenient for the one having to separate the male and female members since water will generally spray about uncontrollably when the two members are separated.

The present invention discloses a flow control device which may be economically manufactured and in which the male and female members are easily engaged for assembly of the device and in which cleaning may take place without interruption of the flow to the remainder of the system in which the device is used or through the device itself and without inconvenience to the user.

SUMMARY OF THE INVENTION

An object of the present invention is to provide a flow control device which is economically manufactured and provides ease of operation, with convenient assembly or limited relative movement for clearing of the flow path.

In accordance with the present invention, a female member is provided having an open end and including inlet means which communicates with a main supply hose to supply irrigating fluid to the interior of the female member, outlet means and smooth internal walls between the inlet and outlet means. A male insert includes a helically threaded portion which is disposed interiorly of the female member when the device is in its assembled position and which cooperates with the smooth internal walls of the female member to form a helical flow path between the inlet and the outlet means. The male insert and female member include interengaging frictional retaining means which seals the open end of the female member and prevents undesired movement of the male insert when the device is in its assembled position. The device can be assembled without rotation of the male insert. Moreover, by rotation and/or limited axial movement of the handle, clogging of the helical flow path can often be relieved while maintaining the seal of the open end of the female member.

BRIEF DESCRIPTION OF THE DRAWINGS

The present invention may be better understood by reference to to the specification when taken in conjunction with the accompanying drawings, in which like numerals refer to like features throughout, wherein:

FIG. 1 shows a drip irrigation system incorporating the flow control device of the present invention.

FIG. 1A shows a filter means for use in the drip irrigation system shown in FIG. 1.

FIG. 2 is a sectional view, taken along line 2—2 of FIG. 1, of the flow control device of the present invention in assembled position in place in a drip irrigation system.

FIG. 3 is an additional male insert for use in a drip irrigation system incorporating the flow control device of the present invention.

FIG. 4 is a sectional side view of a detail of the flow control device shown in FIG. 2.

FIG. 5 is a view taken along line 5—5 of FIG. 4.

FIG. 6 shows an alternate embodiment of the flow control device of the present invention in place in a drip irrigation system.

FIG. 7 is a partial view of another alternate embodiment of the flow control device of the present invention in assembled position.

FIG. 8 is a view taken along line 8—8 of FIG. 7.

DETAILED DESCRIPTION OF THE INVENTION

Referring to FIG. 1 and FIG. 1A, a drip irrigation system comprises a main supply hose 10 which includes a fitting 12 secured at one end thereof. A washer 14 is provided which is held in place in the path of the flow through hose 10 by a connection section (not shown) of main supply hose secured to main supply hose 10 by a threaded end fitting 16 to seal adjoining sections of main supply hose 10 in a manner well known in the art. A filter 17, represented schematically, may also be inserted into the drip irrigation system at any convenient place where it will filter the flow through the entire system, or several such filters 17 may be used to insure more efficient filtration. Filter 17 comprises an elongated filter media 17a, shown herein as a mesh "basket", disposed within a suitable section of main supply hose 10'. Elongated filter media 17a is secured to a fitting 17b and extends longitudinally within main supply hose 10'. Fitting 17b is sealed by washers 14' when fitting 16' is threaded onto an adjoining section (not shown) of main supply hose, in the same manner that washer 14 and fitting 16 cooperate to seal main supply hose 10. Filter media 17a is used so that maximum mesh surface area is available for filtration, which allows the drip irrigation system to be used for long periods of time before filter media 17c becomes clogged and must be cleaned. When the system is in operation, water, or other irrigating fluid, from a source (not shown) enters main supply hose 10 through filter 17 and flows to a local supply tube 18, through a flow control device 20, to the area to be irrigated.

Referring to FIGS. 2, 4 and 5, a first embodiment of a flow control device 20 comprises a female member 28 and a male insert 30. Female member 28 is formed from plastic or other suitable material into a hollow cylinder 32 with smooth internal walls having an open end. Cylinder 32 comprises an upper wall portion and a lower wall portion having a somewhat smaller diameter concentric with the cylindrical bore of the upper wall portion. An internal shoulder 34 is formed below the open end of cylinder 32 at the point where the upper and lower wall portions meet. An inlet means is formed in female member 28 at the end opposite the open end and comprises a tube 36 having a flow passage 38 therethrough. Tube 38 terminates in a head 40, best seen in detail in FIGS. 4 and 5. Head 40 is substantially frustoconical in shape, as indicated by phantom lines in FIG. 4, with a portion removed at an oblique angle to form a flat surface 42 which terminates in a sharp edge. When flow control device 20 is to be incorporated in a drip irrigation system such as that shown here, the sharp edge enables ease of penetration of main supply hose 10 and oblique flat surface 42 prevents a "plug" from hose 10 from forming and stopping up passage 38 when head 40 penetrates hose 10. A shoulder 44 which is formed by head 40 prevents inadvertent removal of female member 28 from hose 10, and by facing flat surface 42 downstream of the flow in hose 10, an eddy wake is formed around head 40 at the inlet to passage 38 to inhibit entrance of particulate matter entrained in the flow into passage 38. An outlet means is formed in female member 28 intermediate the open end and the inlet means and comprises a tube 46 terminating in a head 48 which secures local supply tube 18 thereto when the device is used in a drip irrigation system such as that shown here.

Male insert 30 comprises a handle 50, a flange 52 and a solid cylindrical portion 54. Interengaging frictional retaining means, shown herein as protuberance 56 which circumscribes portion 54 and frictionally engages the cylindrical upper wall portion of female member 28, serves to seal the open end of female member 28 and to prevent undesired or accidental movement of male insert 30, while the upper inner wall portion provides support for limited axial movement to clear a clogged condition without completely disassembling the male insert 30, while maintaining the seal of the open end of cylinder 32. Flange 52 cooperates with the open end of female member 28 and limits inward movement of the male insert 28, when device 20 is in its assembled position. Protuberance 56 cooperates with internal shoulder 34 to effect a more efficient seal, but it will be understood by those skilled in the art that internal shoulder 34 may be omitted without departing from the spirit of the invention, particularly if the members are made of plastic or other somewhat resiliently deformable material which provides the desired limited degree of frictional retention against unintended or undesired removal.

Cylindrical portion 54 includes a helically threaded portion 58 and a nib 60. Helically threaded portion 58 cooperates with female member 28 to form a helical flow path between inlet tube 36 and outlet tube 46. The dimensions are so arranged in the embodiment herein shown that the outlet communicates directly with the helical flow path, but those skilled in the art will recognize that the female member and male insert may be formed in any manner which interposes a helical or tortuous flow path of desired effective cross-section and length between the inlet and outlet means without departing from the spirit of the invention.

Handle 50 is formed as a flat, sign-type member which carries identifying indicia thereon indicating the output flow rate through the helical flow path determined by male insert 30. Handle 50 extends from the open end of female member 28 to permit easy movement of male insert 30 in order to disassemble device 20, and handle 50 may take any configuration which will serve that purpose.

Referring to FIG. 3, an alternate or additional male insert 30' for replacing male insert 30 has a helically threaded portion 58' having a different depth and/or pitch than that of helically threaded portion 58. In a flow control device including device 20 and additional male insert 30', the length and cross-sectional area of the helical flow path may be changed by replacing male insert 30 with alternate male insert 30', thus changing the flow rate through the device. As used herein, a difference in "pitch" is understood to mean a difference in cross-section between threads, or a difference in the length of the helical path established by the threads, or a combination of such factors which will establish a different effective flow rate through outlet 46.

Referring to FIG. 6, an alternate embodiment 20 of the flow control device of the present invention is shown in place in a drip irrigation system. Flow control device 20' comprises outlet means which incorporate a plurality of tubes 46 so that, for example, additional local supply hoses 18 may be used.

Referring to FIGS. 7 and 8, another alternate embodiment 20" of the flow control device of the present invention is shown. In this embodiment, the interengaging frictional means comprises a slot 61 formed in the upper portion of female member 28" and a protuberance 56" which extends partially around male insert 30". The upper portion of male insert 30" is formed with an outside diameter which is substantially the same as the inside diameter of the cooperating portion of female member 28" and male insert 30" may be inserted into female member 28" without rotating male insert 30". To move male insert 30" a limited axial distance, or to remove it from its assembled position, it is rotated so that protuberance 56" is free of slot 61. The use of protuberance 56" and slot 61 provides for more positive interengagement of male insert 30" and female member 28" when device 20" is in its assembled position, with protuberance 56" disposed in slot 61. This permits the flow control device of the present invention to be used in systems where the pressure is high enough so as to render a seal such as that used in device 20 (FIGS. 2 through 5) unstable, and permits the male insert to be rotated or moved a limited distance axially to clear the helical flow path while maintaining the seal of the open end of the female member. The seal of the open end of the female member 28" is maintained by the close tolerance fit between male insert 30" and female member 28" and the fact that protuberance 56", when rotated out of slot 61, forces the walls of the male insert 30" and female member 28" together.

In operation, a drip irrigation system incorporating the flow control device of the present invention will have water flowing through main supply hose 10 in the direction of arrow 16. Flow will enter tube 36 as shown by arrow 64, travel through the helical flow path, and exit to the area to be irrigated through tube 46 and local supply hose 18, as shown by arrow 66.

Filter 17 is located in the main supply hose upstream of the location of the flow control device and removes particulate matter from the flow, which particulate matter would be too large to pass through the helical flow path. For example, in a typical drip irrigation system, the minimum cross-sectional area of the helical flow path would be 0.022 square inches, and elongated filter media 176, would be constructed of a screen having a mesh size small enough to remove particles which would fail to pass easily through a flow path having such a cross-sectional area. If the helical flow path should become clogged, even with the presence of filter 17, the male insert can be rotated or partially removed by merely grasping handle 50 and turning it or otherwise moving the male insert in a limited fashion from its fully assembled position to a position in which protuberance 56 or 56" still cooperates with the female member. When the flow control device having protuberance 56 is used (as in FIGS. 2 and 3), protuberance 56 extends completely around male insert 30 and cooperates with the female member 28 to seal the open end thereof until protuberance 56 is completely free of female member 28. Note that in this embodiment, male insert 30 can be moved without any rotation, further simplifying its use. When the flow control device having protuberance 56" is used (see FIGS. 7 and 8), it is the close tolerance between male insert 30" and female member 28" and the cooperation of protuberance 56" with the smooth internal walls of female member 28" which maintain the seal of the open end of female member 28" during rotation or limited axial movement of male insert 30".

If it should be desired to change the rate of flow in the irrigation system due for example, to changes in long-term weather conditions, the male insert 30 is merely removed and additional male insert 30' is inserted in its place.

The present invention thus disclosed a flow control device in which the component elements are easily and inexpensively manufactured. When the flow control device of the present invention is in operation, its construction enables quick cleaning and changing of the flow rate therethrough. It is of course understood that the flow control device of the present invention need not be used in a drip irrigation system, but is suitable for use in any flow system in which a low flow rate must be provided from a main supply hose carrying fluid at a relatively high flow rate.

Although several specific embodiments of the present invention have been shown, those skilled in the art will perceive modifications other than those specifically pointed out which can be made without departing from the spirit of the invention, and it is intended by the appended claims to cover all such modifications as fall within the true spirit and scope of the invention.

What is claimed as new and desired to be secured by Letters Patent of the United States is:

1. A flow control device of the type suitable for use in a flow system which is supplied with fluid through a main hose comprising:
   a. a female member having an open end and including inlet means for communicating with the main supply hose, outlet means and a portion having smooth internal walls disposed between said inlet means and said outlet means;
   b. a male insert including a handle for assembling and disassembling the device and a helically threaded portion wherein, when the device is in its assembled position, said handle is disposed exteriorly of said open end, said helically threaded portion is disposed interiorly of said female member and cooperates with said portion thereof having smooth internal walls to form a helical flow path between said inlet means and said outlet means, and the device is capable of selective limited movement without disruption of the flow through the device; and wherein said male insert and said female member include interengaging frictional retaining means which, when the device is in its assembled position, hold said male insert and said female member in engagement to seal said open end, prevent undesired movement of said male insert, and maintain the seal of the open end during limited movement of said male insert.

2. The device recited in claim 1 further comprising an additional male insert for replacing said first-mentioned male insert wherein said helically threaded portion of said first-mentioned male insert comprises threads having a first predetermined pitch and said helically threaded portion of said additional male insert comprises threads having a second predetermined pitch.

3. A drip irrigation system including the device recited in claim 1 and further including:
a. a main supply hose for carrying irrigating fluid therethrough wherein said inlet means communicates with said main supply hose to supply irrigating fluid to said helical flow path; and
b. a local supply hose communicating with said outlet means for carrying irrigating fluid from said outlet means.

4. The drip irrigation system recited in claim 3, wherein said inlet means communicates with said main supply hose at a predetermined location, further including a filter for permitting passage therethrough only of particles small enough to pass through said helical flow path wherein said filter is disposed in said main supply hose upstream of said predetermined location.

5. The drip irrigation system recited in claim 4 wherein said filter comprises an elongated filter media disposed interiorly of and extending longitudinally within a section of said main supply hose.

6. The drip irrigation system recited in claim 5 wherein said helical flow path has a minimum cross-sectional area of 0.022 square inches.

7. The device recited in claim 1 wherein said inlet means comprises a tube extending from said female member and terminating at a head for securing said female member to the main supply hose.

8. The device recited in claim 7 wherein said head is substantially frusto-conical in configuration with a portion thereof removed at an oblique angle to form a flat surface terminating in a sharp edge for easing penetration of the main supply hose.

9. A drip irrigation system including the device recited in claim 8 and further including a main supply hose wherein said head is disposed interiorly of said main supply hose and said flat surface faces downstream of the flow in said main supply hose.

10. The device recited in claim 1 wherein said handle has identifying indicia thereon for indicating the flow rate through said helical flow path.

11. The device recited in claim 1 wherein said outlet means comprises a tube extending from said female member and terminating in a head for securing a hose to said tube.

12. The device recited in claim 11 wherein said outlet means comprises a plurality of said tubes.

13. The device recited in claim 1 wherein said interengaging frictional retaining means comprises a protuberance circumscribing said male insert wherein, when the device is in its assembled position, said protuberance frictionally engages said smooth internal walls of said female member.

14. The device recited in claim 13 wherein:
a. said female member comprises a hollow cylinder wherein said inlet means is disposed at the end of said cylinder opposite said open end and said outlet means is disposed intermediate of both ends and communicates directly with said helical flow path; and
b. said male insert comprises a solid cylindrical portion including said helically threaded portion wherein said protuberance circumscribes said solid cylindrical portion and further comprises a flange for cooperating with said open end to limit the movement of said male insert when said device is in its assembled position.

15. The device recited in claim 14 wherein said hollow cylinder further includes an upper wall portion and a lower wall portion of smaller diameter and concentric therewith wherein an internal shoulder is formed where said upper and lower wall portions meet and, when the device is in its assembled position, said protuberance engages said upper wall portion and said internal shoulder and said helically threaded portion cooperates with said lower wall portion, and wherein said upper wall portion cooperates with said protuberance to provide support therefor and maintain the seal of said open end of said female member during limited axial movement of said male insert.

16. The device recited in claim 1 wherein:
a. said female member includes a hollow, cylindrical upper wall portion one end of which comprises said open end having a predetermined internal diameter and an internal slot formed partially around the circumference thereof;
b. said male insert comprises a solid cylindrical portion having an outside diameter substantially the same as said predetermined internal diameter of said cylindrical upper wall portion of said female member and a protuberance extending partially around the circumference thereof; and
c. said interengaging frictional retaining means comprises said slot and said protuberance wherein said protuberance cooperates with said slot when the device is in its assembled position.

* * * * *